US012641196B2

(12) United States Patent
Sonoda et al.

(10) Patent No.: US 12,641,196 B2
(45) Date of Patent: May 26, 2026

(54) TERMINAL APPARATUS, OUTPUT METHOD, AND PROGRAM

(71) Applicant: NEC Platforms, Ltd., Kawasaki (JP)

(72) Inventors: Takashi Sonoda, Kanagawa (JP); Yuka Koseki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 141 days.

(21) Appl. No.: 18/689,511

(22) PCT Filed: Aug. 10, 2022

(86) PCT No.: PCT/JP2022/030627
§ 371 (c)(1),
(2) Date: Mar. 6, 2024

(87) PCT Pub. No.: WO2023/157342
PCT Pub. Date: Aug. 24, 2023

(65) Prior Publication Data
US 2024/0372966 A1 Nov. 7, 2024

(30) Foreign Application Priority Data

Feb. 18, 2022 (JP) ................................. 2022-023894

(51) Int. Cl.
*H04N 7/15* (2006.01)
*G10L 15/26* (2006.01)
*H04N 7/14* (2006.01)
(52) U.S. Cl.
CPC ............. *H04N 7/152* (2013.01); *G10L 15/26* (2013.01); *H04N 7/147* (2013.01)

(58) Field of Classification Search
CPC ......... H04N 7/152; H04N 7/147; G10L 15/26
See application file for complete search history.

(56) References Cited

U.S. PATENT DOCUMENTS 8,483,098 B2 7/2013 Vadlakonda et al.
2002/0188731 A1 12/2002 Potekhin et al.
(Continued)

FOREIGN PATENT DOCUMENTS

JP H07-038870 A 2/1995
JP H07-105106 A 4/1995
(Continued)

OTHER PUBLICATIONS

International Search Report for PCT Application No. PCT/JP2022/030627, mailed on Nov. 8, 2022.
(Continued)

*Primary Examiner* — Amal S Zenati
(74) *Attorney, Agent, or Firm* — Sughrue Mion, PLLC

(57) ABSTRACT

There is provided a terminal apparatus, including: a reception part that receives a plurality of meeting data distributed from a plurality of meeting servers; a selection part that selects one of the plurality of meeting data as main meeting data, and selects the other meeting data as sub meeting data; an output setting part that sets, based on the selection by the selection part, an output setting in which a meeting data output mode is set, for an individual one of the meeting data; and an output part that outputs, based on the output settings, the meeting data. The output setting part sets the output setting(s) of the sub meeting data differently from the output setting of the main meeting data.

9 Claims, 8 Drawing Sheets

(56) References Cited

U.S. PATENT DOCUMENTS

| | | | |
|---|---|---|---|
| 2007/0121530 A1 | 5/2007 | Vadlakonda et al. | |
| 2007/0127670 A1 | 6/2007 | Morishima et al. | |
| 2014/0123030 A1 | 5/2014 | Kozloski et al. | |
| 2016/0255126 A1* | 9/2016 | Sarris ................. | H04L 65/1096 |
| | | | 348/14.08 |
| 2021/0377062 A1* | 12/2021 | Stevens ................ | H04M 3/564 |
| 2022/0400022 A1* | 12/2022 | Desai .................. | G06V 40/107 |

FOREIGN PATENT DOCUMENTS

| | | | |
|---|---|---|---|
| JP | 2004-531952 A | 10/2004 | |
| JP | 2016-500983 A | 1/2016 | |
| WO | 2006/003709 | 1/2006 | |
| WO | WO-2022024371 A1* | 2/2022 | ............... H04N 7/15 |

OTHER PUBLICATIONS

Japanese Office Communication for JP Application No. 2022-023894 mailed on Oct. 25, 2022 with English Translation.

* cited by examiner

TERMINAL APPARATUS, OUTPUT METHOD, AND PROGRAM

This application is a National Stage Entry of PCT/JP2022/030627 filed on Aug. 10, 2022, which claims priority from JP Patent Application 2022-023894 filed on Feb. 18, 2022, the contents of all of which are incorporated herein by reference, in their entirety.

REFERENCE TO RELATED APPLICATION

The present invention is based upon and claims the benefit of the priority of Japanese patent application No. 2022-023894, filed on Feb. 18, 2022, the disclosure of which is incorporated herein in its entirety by reference thereto. The present invention relates to a terminal apparatus, an output method, and a program.

BACKGROUND

Technical Field

The present invention relates to a terminal apparatus, an output method, and a program.

BACKGROUND ART

Recently, there are many cases in which people have meetings with other members who are, for example, working remotely at distant locations. In these cases, these people can use a remote meeting system. However, many remote meeting systems assume that users participate in a single meeting. In reality, a plurality of meetings can be scheduled in the same period of time. Therefore, a meeting service that can enable its users to manage such cases is demanded.

PTL 1 discloses a multipoint electronic meeting apparatus as follows. This technique is directed to an electronic meeting apparatus that enables a user to participate in a plurality of meetings and that realizes a user interface with which the user can easily recognize the plurality of meetings. Because the electronic meeting apparatus controls the audio of the plurality of meetings, the user can easily recognize the audio of the meeting he or she is hearing.
PTL 1: Japanese Unexamined Patent Application Publication No. 07-105106 A

SUMMARY

Technical Problem

The disclosure of the above PTL 1 is incorporated herein by reference thereto. The following analysis has been made by the present inventors.

According to the above invention disclosed, only the audio of an active one of the windows displaying the plurality of meetings is outputted, and regarding the information about the other deactivated windows, the audio of these meetings is outputted at a low volume. That is, interference could be caused among the meetings due to the nature of the audio. Thus, the technique has a problem in that the user could miss hearing necessary information due to the interference.

An object of the present invention is to provide a terminal apparatus, an output method, and a program that enable a user to participate in a plurality of electronic meetings and that contribute to realizing a viewing and hearing mode in which information presented in the meetings does not interfere with each other.

Solution to Problem

According to a first aspect of the present invention or what is disclosed, there is provided a terminal apparatus, including: a reception part that receives a plurality of meeting data distributed from a plurality of meeting servers; a selection part that selects one of the plurality of meeting data as main meeting data, and selects the other meeting data as sub meeting data; an output setting part that sets, based on the selection by the selection part, an output setting in which a meeting data output mode is set, for an individual one of the meeting data; and an output part that outputs, based on the output settings, the meeting data, wherein the output setting part sets the output setting(s) of the sub meeting data differently from the output setting of the main meeting.

According to a second aspect of the present invention or what is disclosed, there is provided an output method, including: receiving a plurality of meeting data distributed from a plurality of meeting servers; selecting one of the plurality of meeting data as main meeting data, and selecting the other meeting data as sub meeting data; setting, based on the selection, an output setting in which a meeting data output mode is set, for an individual one of the meeting data; and outputting, based on the output settings, the meeting data, wherein the setting of the output settings includes setting the output setting(s) of the sub meeting data differently from the output setting of the main meeting data.

According to a third aspect of the present invention or what is disclosed, there is provided a program causing a computer to execute processing for: receiving a plurality of meeting data distributed from a plurality of meeting servers; selecting one of the plurality of meeting data as main meeting data, and selecting the other meeting data as sub meeting data; setting, based on the selection, an output setting in which a meeting data output mode is set, for an individual one of the meeting data; and outputting, based on the output settings, the meeting data, wherein the setting of the output settings includes setting the output setting(s) of the sub meeting data differently from the output setting of the main meeting data.

According to the individual aspects of the present invention or what is disclosed, there are provided a terminal apparatus, an output method, and a program.

EXAMPLE EMBODIMENTS

Figure 1:
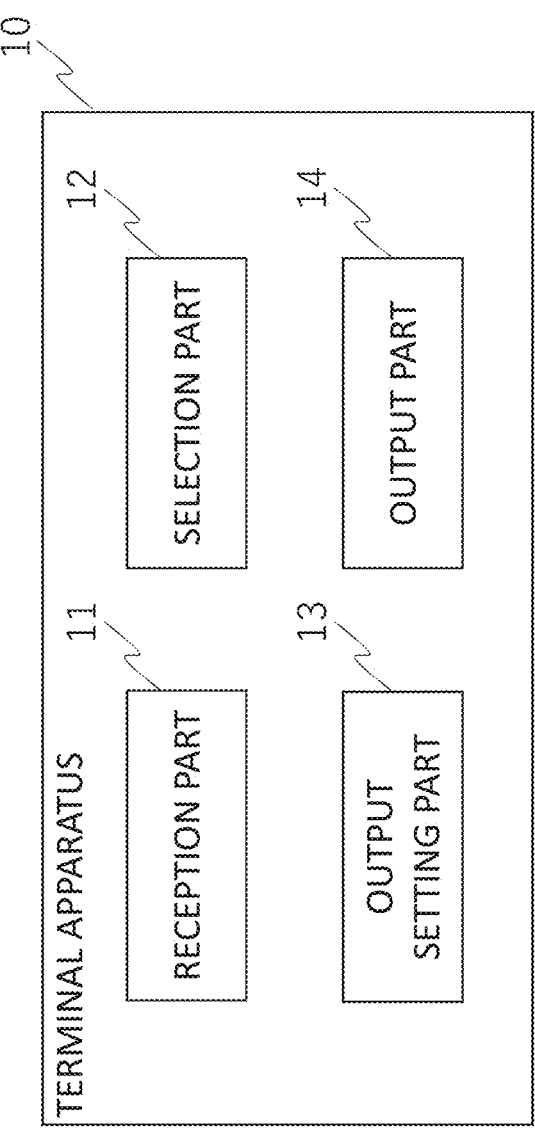
FIG. 1 is a block diagram illustrating an example of a configuration of a terminal apparatus according to an example embodiment.

First, an outline of an example embodiment will be described. In the following outline, various components are denoted by reference characters for the sake of convenience. That is, the following reference characters are only used as examples to facilitate understanding of the present invention. Thus, the description of the outline is not intended to impose any limitations. An individual connection line between blocks in the drawings signifies both one-way and two-way directions. An arrow schematically illustrates a principal signal (data) flow and does not exclude bidirectionality. In addition, while not explicitly illustrated in the circuit diagrams, the block diagrams, the internal configuration diagrams, the connection diagrams, etc. in the disclosure of the present application, an input port and an output port exist at an input end and an output end of an individual connection line. The same holds true for the input-output interfaces.

FIG. 1 is a block diagram illustrating an example of a configuration of a terminal apparatus according to an example embodiment. As illustrated in FIG. 1, a terminal apparatus 10 according to an example embodiment includes a reception part 11, a selection part 12, an output setting part 13, and an output part 14.

The reception part 11 receives a plurality of meeting data distributed from a plurality of meeting servers. The selection part 12 selects one of the plurality of meeting data as main meeting data, and selects the other meeting data as sub meeting data. The output setting part 13 sets, based on the selection by the selection part 12, an output setting in which a meeting data output mode is set, for the individual one of the meeting data. The output part 14 outputs, based on the output settings, the meeting data. The output setting part 13 sets the output setting(s) of the sub meeting data differently from the output setting of the main meeting data.

Hereinafter, specific example embodiments will be described in more detail with reference to the drawings. In the individual example embodiments, the same components will be denoted by the same reference characters, and redundant description thereof will be omitted.

First Example Embodiment

Figure 2:
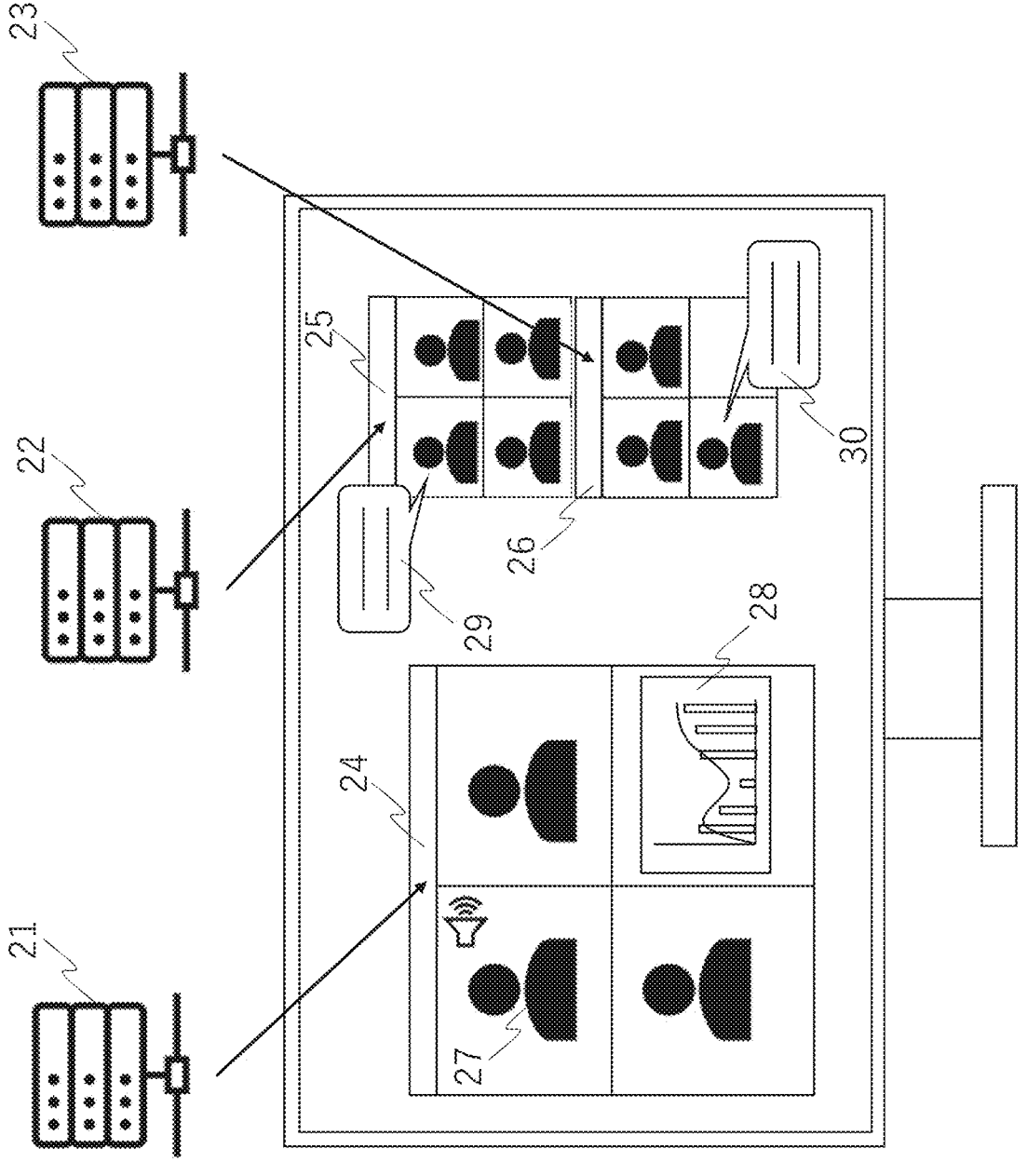
FIG. 2 is a schematic diagram illustrating an outline of processing of a terminal apparatus according to a first example embodiment.

FIG. 2 is a schematic diagram illustrating an outline of processing of a terminal apparatus according to a first example embodiment. As illustrated in FIG. 2, meetings are distributed from meeting servers 21 to 23. These meetings are displayed in a plurality of windows 24 to 26 on a screen. The "main meeting" is displayed in the window 24, and the "sub meetings" are displayed in the windows 25 and 26. The number of meetings displayed is not limited to 3. In the main meeting, a speaker 27 is making a statement while sharing a document 28, and this statement is outputted as audio from a speaker. Meanwhile, in the windows 25 and 26 displaying the sub meetings, instead of audio, the statements of the speakers are recognized and converted into texts by a speech-to-text technique, and these texts are displayed in pop-up windows. Use of these pop-up windows is only an example, and the present example embodiment is not limited to this example. Various modes may be used to present the texts. As described above, the terminal apparatus according to the present example embodiment classifies a plurality of meetings into a main meeting and sub meetings, outputs the audio of the main meeting, and outputs the statements in the sub meetings as texts.

Figure 3:
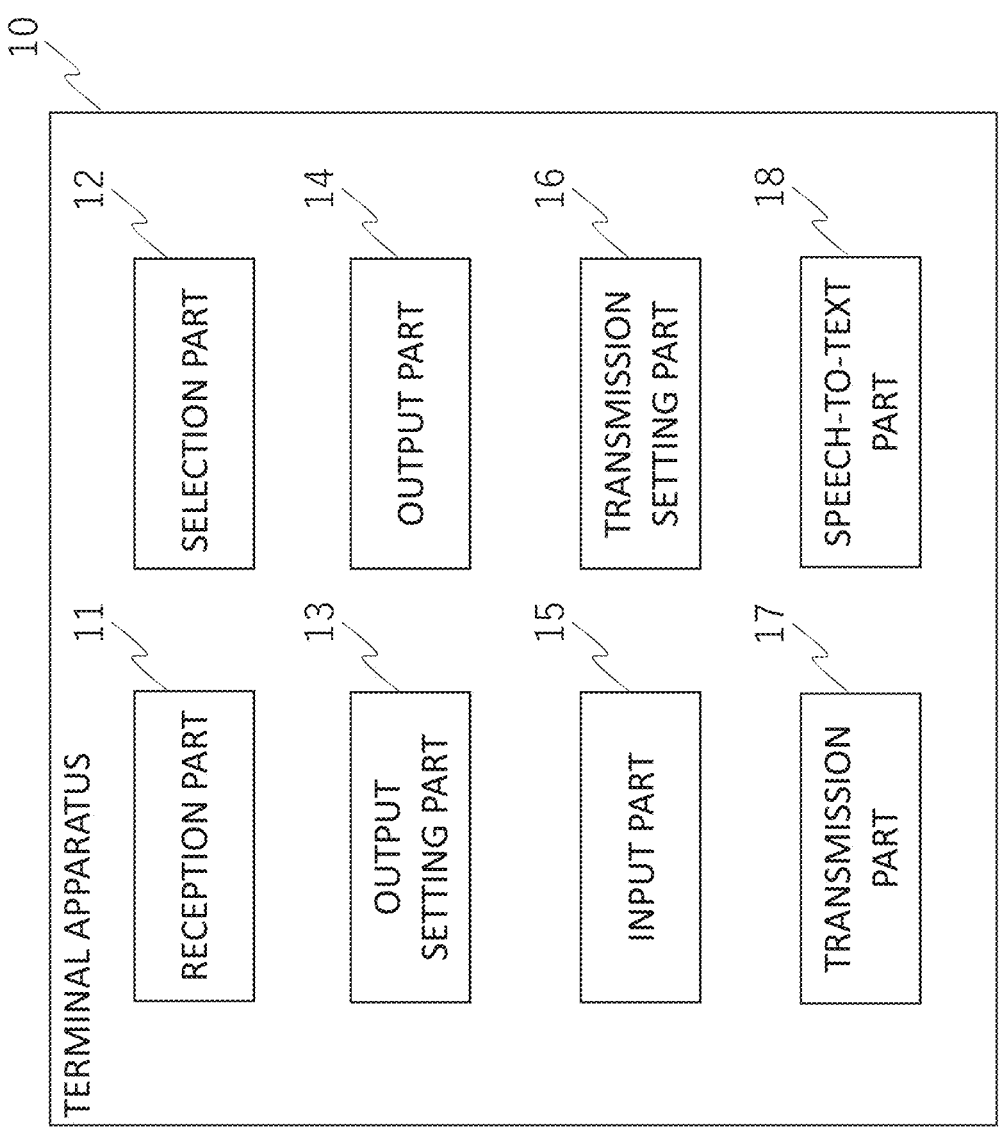
FIG. 3 is a block diagram illustrating an example of a configuration of the terminal apparatus according to the first example embodiment.

FIG. 3 is a block diagram illustrating an example of a configuration of the terminal apparatus according to the first example embodiment. As illustrated in FIG. 3, a terminal apparatus 10 according to the present example embodiment includes a reception part 11, a selection part 12, an output setting part 13, an output part 14, an input part 15, a transmission setting part 16, a transmission part 17, and a speech-to-text part 18.

The reception part 11 receives a plurality of meeting data distributed from a plurality of meeting servers. The individual "meeting data" refers to distributed data of audio and an image distributed from a meeting server. Data used in an existing remote meeting system may be used as the distributed data. That is, the individual "meeting server" may be a server used in an existing remote meeting system. Although the terminal apparatus displays the plurality of meetings on separate windows, the windows may be displayed by an application program for an existing remote meeting system or may be generated uniquely by the terminal apparatus 10. The received meeting data is supplied to the output part 14.

The selection part 12 selects one of the plurality of meeting data as main meeting data, and selects the other meeting data as sub meeting data. Concretely, for example, the selection part 12 receives a selection operation via an input/output interface such as a keyboard or a mouse, selects a main meeting from the plurality of meetings, and supplies a trigger for changing settings to the output setting part 13 and the transmission setting part 16. For example, the selection part 12 may select a meeting that is started at the earliest time as the main meeting, and may select a meeting that is started at the second earliest time as a sub meeting. When a participant brings up a certain topic in a sub meeting, the selection part 12 may change this sub meeting to the main meeting. When a participant starts to share a certain document in a sub meeting, the selection part 12 may change this sub meeting to the main meeting. The selection part 12 may set the meeting data displayed in an activated window as the meeting data of the main meeting.

In addition, when the reception part 11 starts to receive distributed meeting data, if the output part 14, which will be described below, is already outputting audio or if the input part 15, which will be described below, is already receiving audio, the selection part 12 may handle the distributed meeting data as sub meeting data.

The output setting part 13 sets, based on the selection by the selection part 12, an output setting in which a meeting data output mode is set, for the individual one of the meeting data. The "meeting data output mode" refers to, for example, a combination of a setting in which, regarding the meeting data of a meeting selected as a sub meeting, only the image of the distributed meeting data is outputted while the audio is muted and a setting in which no image and audio are transmitted from the user of the terminal apparatus 10. As described above, the output setting part 13 can set the output settings of the sub meeting data differently from the output setting of the main meeting data. Based on these settings, the output part 14, which will be described below, is controlled.

The output setting part 13 may set the output settings of the sub meeting data differently from the output setting of the main meeting data. That is, as described above, the output setting part 13 characterizes the distribution modes of the main meeting and the sub meetings, for example, such that the audio output is on for the main meeting data and the audio output is off for the sub meeting data, and such that while the image output is on for the main and sub meeting data, a moving image is outputted for the main meeting data and texts are outputted for the sub meeting data. Because of these differences in output setting, the user is able to view the image and hear the audio of the plurality of meeting data without interference.

The output part 14 outputs, based on the output settings, the meeting data. Concretely, the output part 14 receives the output settings from the output setting part 13, controls the audio output and the image output, and outputs the audio and image. Mainly, the output part 14 corresponds a speaker, a display device, and device drivers controlling the speaker and the display device, for example.

The switching between the main meeting and a sub meeting may be performed in coordination with an audio output ON/OFF operation. The terminal apparatus may further include an audio output setting reception part (not illustrated) that receives an operation for activating or deactivating the audio output for the individual one of the meeting data. The output setting part 13 activates or deactivates the audio output for the individual one of the meeting data, based on the operation. If the audio output of meeting data is activated, the selection part 12 may select this meeting data as main meeting data and may select the other meeting data as sub meeting data. In another case, if the audio output of meeting data is deactivated, the selection part 12 may select this meeting data as sub meeting data and may select one of the other meeting data as main meeting data.

The input part 15 receives audio and an image. Mainly, the input part 15 corresponds to devices for acquiring an image and audio such as a microphone and a camera, and device drivers controlling these devices, for example. The acquired image and audio are supplied to the transmission part 17, which will be described below.

The transmission setting part 16 sets a mode for transmitting audio and an image for an individual one of the meeting servers as transmission destinations. For example, the transmission setting part 16 performs control such that the transmission part 17, which will be described below, transmits the audio and image received from the microphone and the camera to the meeting server corresponding to the main meeting while transmitting only the image to the meeting servers corresponding to the sub meetings without transmitting the audio.

The transmission setting part 16 may set the transmission settings of the sub meeting data differently from the transmission setting of the main meeting data. As described above, the transmission setting part 16 may set settings such that the audio and the image are transmitted to the meeting server corresponding to the main meeting while only the image is transmitted to the meeting servers corresponding to the sub meetings without transmitting the audio. As described above, the transmission setting part can set the transmission settings of the sub meeting data differently from the transmission setting of the main meeting data.

Based on the settings by the transmission setting part 16 and the output setting part 13, the output setting part 13 can set a setting such that the audio of the sub meeting data is not outputted, and the transmission setting part can set a setting such that no audio is transmitted to the transmission sources of the sub meeting data. That is, the user can participate in a plurality of meetings in a mode in which the main meeting is not interfered with by the other sub meetings.

The transmission part 17 transmits audio data of the audio and image data of the image to the meeting servers corresponding to the meeting data. The transmission part 17 transmits the data to the meeting servers via a network in the transmission mode set by the transmission setting part 16.

The speech-to-text part 18 converts the audio of the meeting data into texts by using speech recognition. In the meeting data received by the reception part 11, the speech-to-text part 18 acquires the audio and performs speech recognition (Speech to Text) approximately in real time, and the output part 14 outputs the result. While an existing speech recognition engine may be used, it is desirable to use a high-speed recognition engine that can perform real-time processing.

The output part 14 may output the text obtained by the conversion in any one of various output modes. For example, a balloon may be displayed near a speaker as illustrated in FIG. 2, and a conversion result may be displayed in the balloon. Alternatively, a conversion result may be displayed under or beside the image of a speaker, as in a movie subtitle. Still alternatively, a method for displaying conversion results chronologically in timeline format may be used, as used in a chat tool.

In order for the user to participate in a plurality of meetings while avoiding audio interference, it is desirable to use a mode in which the image and audio of the meeting data of the main meeting are outputted, the audio of the sub meeting data is converted into texts, and the output part outputs the texts of the sub meeting data obtained by the conversion.

Figure 4:
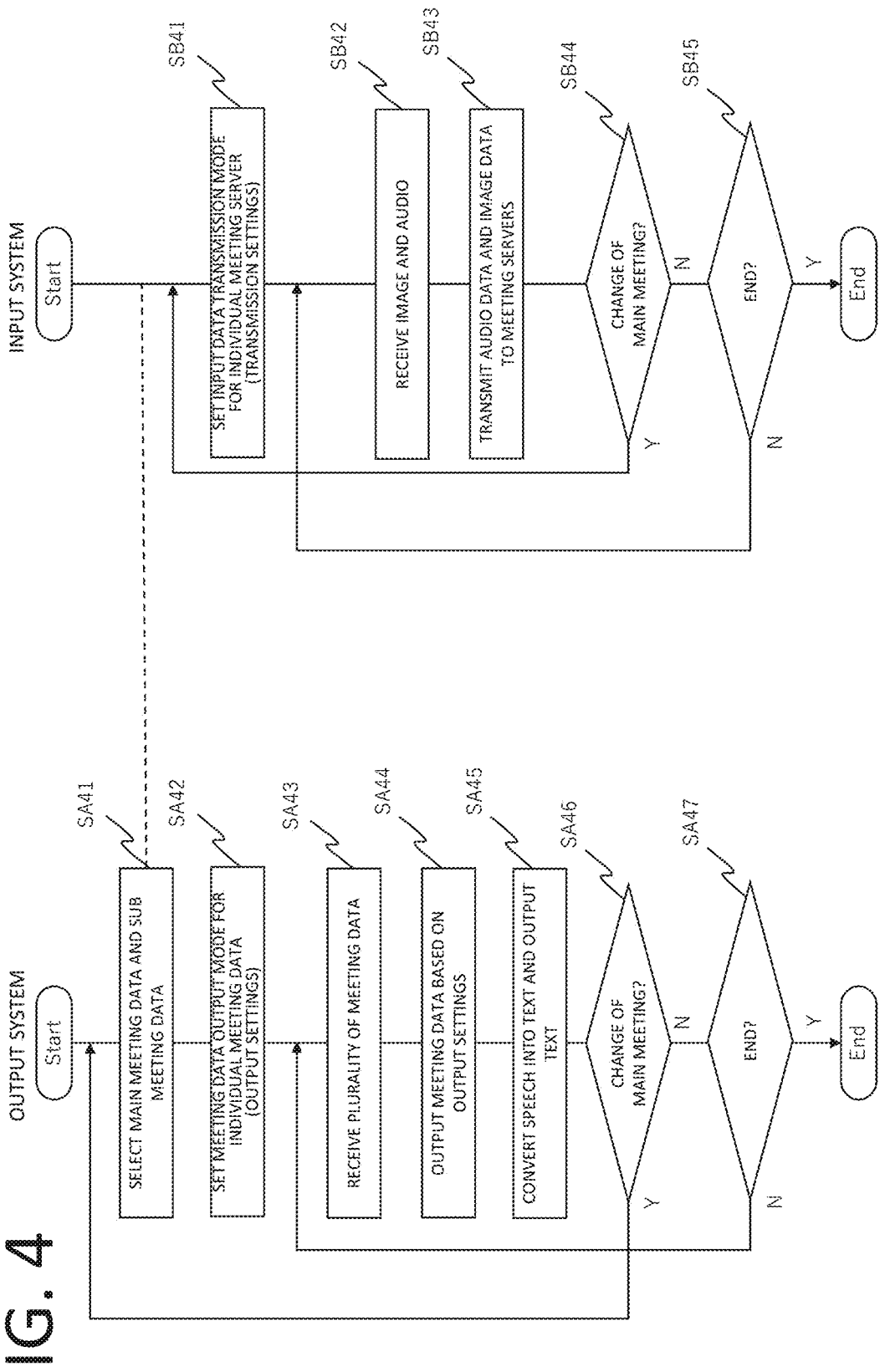
FIG. 4 is a flowchart illustrating an example of an operation of the terminal apparatus according to the first example embodiment.

The speech-to-text part 18 may have a notification function of outputting a notification(s) when a character string(s) set in advance is included in a conversion result(s). To participate in a sub meeting at an appropriate timing, the user needs to constantly monitor the character strings obtained by the conversion by the speech-to-text part 18 and needs to decide when to participate. However, by setting a keyword(s) and by causing the speech-to-text part 18 to monitor the proceedings of the sub meetings and to output a notification(s) when the set keyword(s) appears, the user can focus on the main meeting without paying too much attention to the sub meetings. [Description of Operation] An example of an operation of the terminal apparatus 10 according to the present example embodiment will be described with reference to FIG. 4. FIG. 4 is a flowchart illustrating an example of an operation of the terminal apparatus 10 according to the first example embodiment.

First, the processing in the output system will be described. When the terminal apparatus 10 starts to operate, the terminal apparatus 10 selects main meeting data and sub meeting data (step SA41). Next, the terminal apparatus 10 sets a meeting data output mode for the individual one of the meeting data (step SA42). Next, the terminal apparatus 10 receives the plurality of meeting data (step SA43). Upon receiving the meeting data, the terminal apparatus 10 outputs, based on the output settings, the meeting data (step SA44). When outputting the meeting data, the terminal apparatus 10 converts speech into texts and outputs the texts (step SA45). If change of the main meeting occurs (step SA46, Y), the processing returns to step S41 of selecting the main meeting data and the sub meeting data. If change of the main meeting does not occur (step SA46, N), the terminal apparatus 10 determines whether the user has ended the participation in the meetings. If the user continuously participates in the meetings (step SA47, N), the processing returns to step SA43 of receiving the plurality of meeting data. If the user has ended the participation in the meetings (step SA47, Y), the terminal apparatus 10 ends its operation.

Next, the processing in the input system will be described. The processing in the input system and the processing in the output system may be performed in parallel. When the terminal apparatus 10 starts to operate, in the output system, the terminal apparatus 10 selects main meeting data and sub meeting data. This selection is also adopted in the input system (a dotted line portion). Next, the terminal apparatus 10 sets an input data transmission mode for the individual one of the meeting servers (step SB41). Next, the terminal apparatus 10 receives an image and audio, for example, from a camera and a microphone (step SB42). Next, the terminal apparatus 10 transmits the received image and audio to the meeting servers as image data and audio data (step SB43). If change of the main meeting occurs (step SB44, Y), the processing returns to step SB41 of setting the input data transmission mode for the individual one of the meeting servers. If change of the main meeting does not occur (step SB44, N), the terminal apparatus 10 determines whether the user has ended the participation in the meetings. If the user has not ended the participation in the meetings (step SB45, N), the processing returns to step SB42 of receiving the image and audio. If the user has ended the participation in the meetings (step SB45, Y), the terminal apparatus ends its operation.

[Hardware Configuration]

Figure 5:
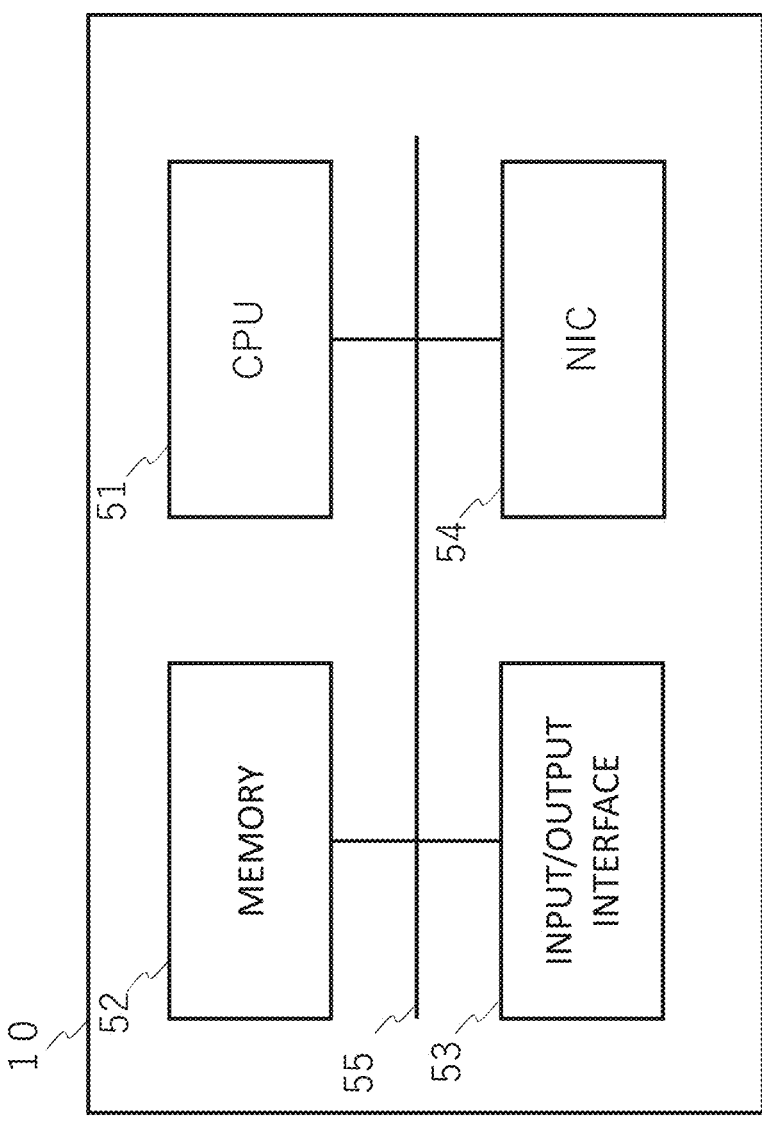
FIG. 5 is a schematic diagram illustrating a hardware configuration of the terminal apparatus according to the first example embodiment.

The terminal apparatus 10 according to the present example embodiment can be configured by an information processing apparatus (a computer), and includes components illustrated as an example in FIG. 5. For example, the terminal apparatus 10 includes a central processing unit (CPU) 51, a memory 52, an input/output interface 53, and a network interface card (NIC) 54, which is communication means. These components are connected to each other via an internal bus 55.

The configuration illustrated in FIG. 5 is not intended to limit the hardware configuration of the terminal apparatus 10. The terminal apparatus 10 may include hardware not illustrated in FIG. 5 or may be configured without the input/output interface 53, depending on the need. In addition, for example, the number of CPUs included in the terminal apparatus 10 is not limited to the example illustrated in FIG. 5. For example, a plurality of CPUs may be included in the terminal apparatus 10.

The memory 52 is a random access memory (RAM), a read-only memory (ROM), or an auxiliary storage device (a hard disk, for example).

The input/output interface 53 is means used as an interface for a display apparatus or an input apparatus not illustrated. The display apparatus is, for example, a liquid crystal display. The input apparatus is, for example, an apparatus such as a keyboard or a mouse that receives user operations.

The functions of the terminal apparatus 10 are realized by: a program group (processing modules) such as a reception program, a selection program, an output setting program, a speech-to-text program, an output program, an input program, a transmission setting program, and a transmission program; and a data group such as the default values of the output settings and input settings. The program group and the data group are stored in the memory 52. For example, the processing modules are realized when the CPU 51 executes the individual programs stored in the memory 52. The individual programs may be updated by downloading program updates via a network or by using a storage medium storing program updates. The processing modules may be realized by semiconductor chips. That is, the terminal apparatus 10 has means for executing the functions of the above-described processing modules by using some hardware and/or software.

[Hardware Operation]

First, a hardware operation in the processing in the output system will be described. First, when the terminal apparatus 10 starts to operate, the selection program is read out from the memory 52 by the CPU 51, becomes executable, and selects the main meeting data and sub meeting data. Concretely, the selection program selects main meeting data or sub meeting data based on the input/output interface 53. When the terminal apparatus 10 is already receiving first meeting data and is already outputting audio, if the terminal apparatus 10 newly receives second meeting data, the terminal apparatus 10 may set this second meeting data as sub meeting data and may set the first meeting data as the main meeting data.

Next, the output setting program is read out from the memory 52 and becomes executable by the CPU 51. This program receives the identifier of the selected main meeting data and the identifiers of the selected sub meeting data from the selection program or the reception program, which will be described below. Next, the CPU 51 reads out the default values of the output settings of the main meeting data and the sub meeting data stored in the memory 52. Next, the output program is read out from the memory 52 and becomes executable by the CPU 51. The output setting program supplies the output setting values and the identifiers of the main meeting data and the sub meeting data to the output program. Next, the reception program is read out from the memory 52 and becomes executable by the CPU 51. This program receives the meeting data from the meeting servers via the NIC 54. The received data is supplied to the output program and the speech-to-text program.

Next, the speech-to-text program is read out from the memory 52 and becomes executable by the CPU 51. This program reads the sub meeting data supplied from the reception program and converts the audio portion of the received meeting data into texts by performing speech recognition processing. The text data is supplied to the output program.

The output program identifies the meeting data supplied from the reception part by using the identifier of the main meeting data, reflects the output setting values on the meeting data, and outputs the resultant meeting data from the input/output interface 53 such as a display and a speaker, for example. In addition, for example, the output program superimposes the text data supplied from the speech-to-text program on the image of the sub meeting data on the display of the input/output interface 53, and outputs the resultant data.

Regarding the main meeting switching processing, when the user performs a predetermined operation by using the input/output interface 53, an interrupt occurs, and the selection program becomes executable by the CPU 51. When the user enters an operation by using the input/output interface 53 such as a keyboard or a mouse and selects the main meeting, the identifier of the main meeting data is supplied to the output setting program. Along with this identifier, the default values of the output setting values of the main meeting are supplied to the output program.

The main meeting may be switched based on activation and deactivation of the audio output. In this case, the audio output setting reception program is started, and activation or deactivation of the audio output is received. The audio output setting reception program supplies the identifier of the meeting data of which the audio output has been activated to the output setting program or the selection program, which then sets this meeting data as the main meeting data. In this way, a sub meeting is switched to the main meeting.

Next, a hardware operation in the processing in the input system will be described. First, the selection program in the processing in the output system selects main meeting data and sub meeting data. Next, the transmission setting program is read out from the memory 52 and becomes executable by the CPU 51. This program receives the identifier of the main meeting data and the identifiers of the sub meeting data from the selection program. In addition, this program reads out the default values of the transmission settings of the main meeting and the sub meetings stored in the memory 52.

Next the input program is read out from the memory 52 and becomes executable by the CPU 51. This program acquires audio and an image from the input/output interface 53 such as a microphone or a camera, for example. Next, the transmission program is read out from the memory 52 and becomes executable by the CPU 51. The acquired audio and image are supplied to the transmission program as input data. The transmission program receives the setting values of the main meeting and the sub meetings from the transmission setting program, and resolves the access destinations of the servers that distribute the main meeting data and the sub meeting data from the identifier of the main meeting data and the identifiers of the sub meeting data. The transmission program reflects the transmission setting values for the resolved access destinations (addresses) and transmits the resultant input data to the resolved access destinations (addresses).

Regarding the main meeting switching processing, the transmission setting program receives the identifier of the selected main meeting data and the identifiers of the selected sub meeting data from the selection program in the output system, and reads out the default values of the transmission settings of the main meeting and the sub meetings stored in the memory 52. The transmission setting program supplies these values and the identifiers to the transmission program. In this way, a sub meeting is switched to the main meeting.

Description of Advantageous Effects

With the terminal apparatus according to the first example embodiment, the user can participate in a plurality of electronic meetings in which the output mode of the main meeting is set differently from the output modes of the sub meetings. Since the terminal apparatus recognizes and converts the audio of the meeting data of the sub meetings into texts and presents the resultant texts, the user can recognize the information presented by the meetings. In particular, the terminal apparatus can realize a viewing and hearing mode in which the audio does not interfere with each other.

Second Example Embodiment

Next, a configuration and an operation of a meeting system according to a second example embodiment will be described. In this second example embodiment, the above-described example embodiment is provided as a meeting service.

Figure 6:
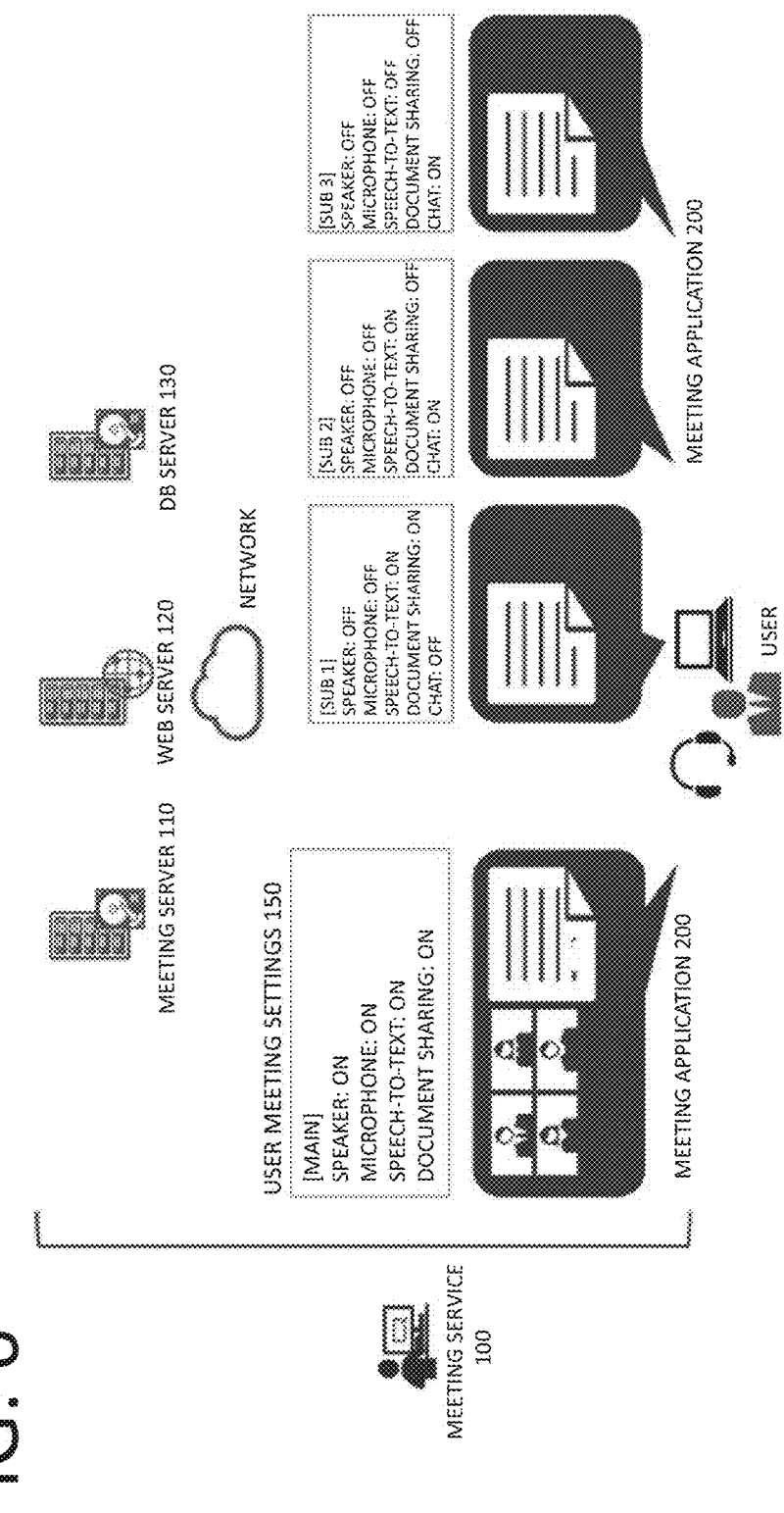
FIG. 6 is a diagram illustrating an outline and a configuration of a system according to a second example embodiment.
Figure 7:
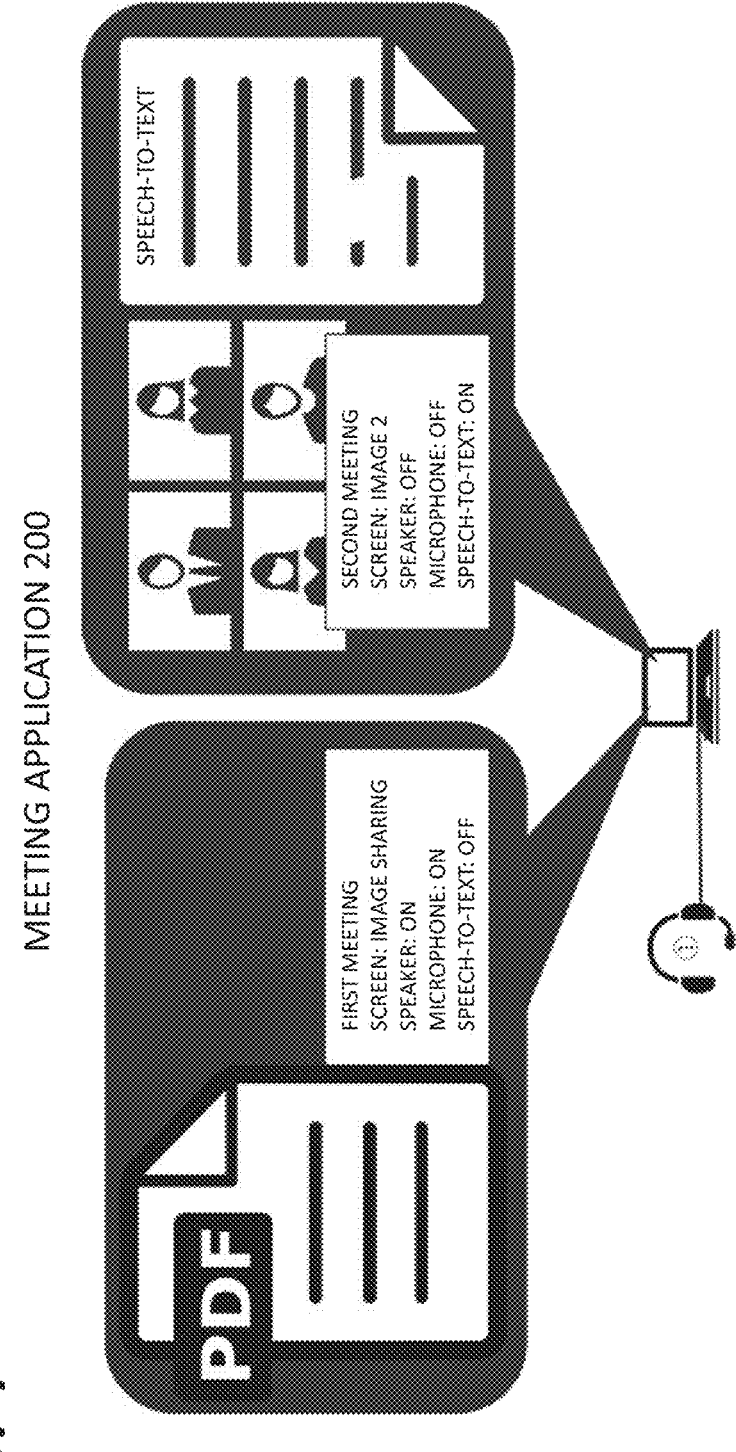
FIG. 7 is a diagram illustrating an outline of a service provided by the system according to the second example embodiment.
Figure 8:
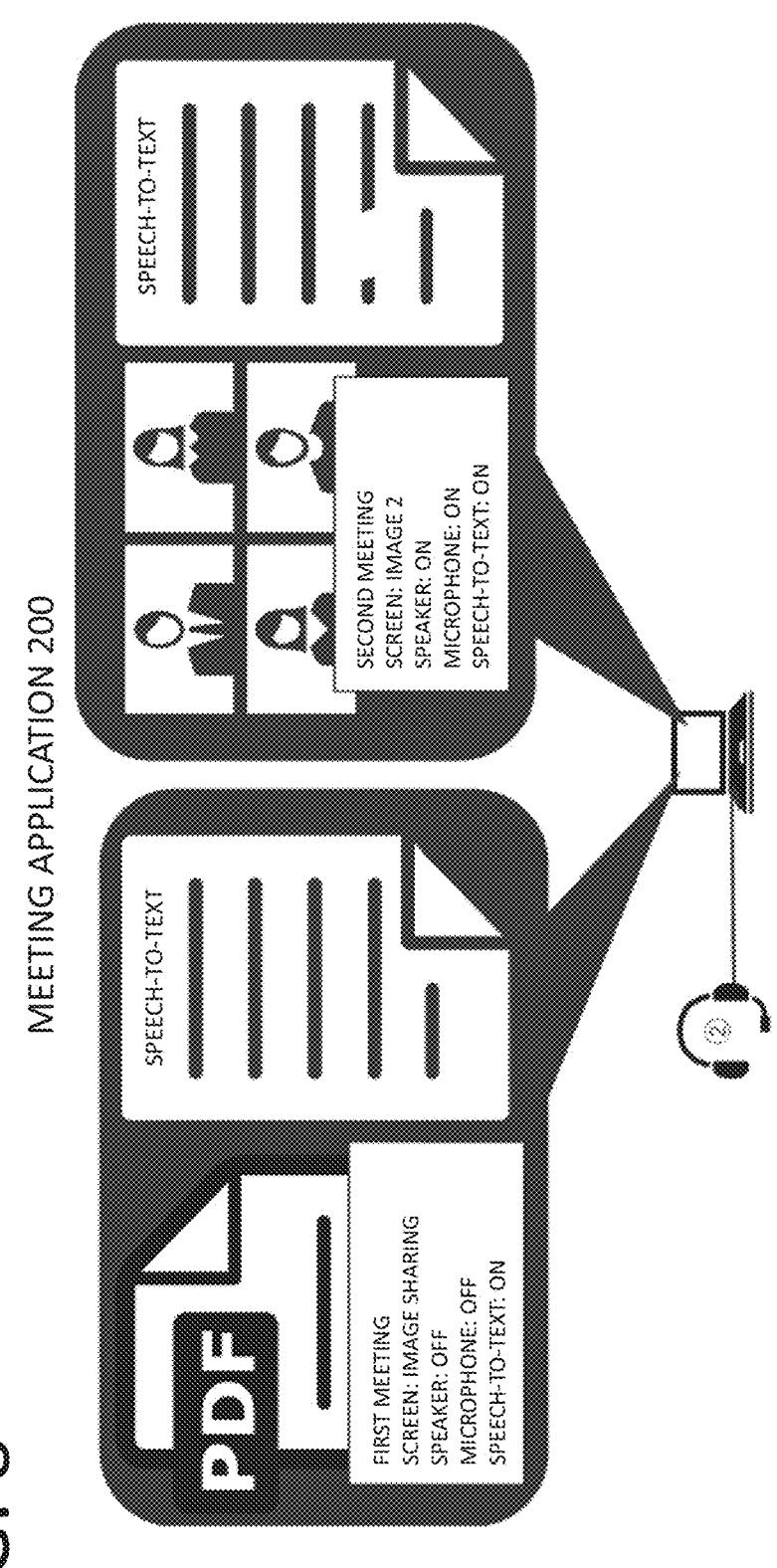
FIG. 8 is a diagram illustrating an outline of a service provided by the system according to the second example embodiment.

FIG. 6 illustrates an outline and a configuration of a system according to a second example embodiment. A meeting application 200 has a function of allowing, from this state, a user to participate in second meetings reserved in advance at the same time when the user clicks URLs in mails or a schedule. FIGS. 7 and 8 each illustrate an outline of a service provided by the system according to the present example embodiment. As illustrated in FIG. 7, the meeting application 200 starts second meetings as sub meetings, and displays the proceedings as texts obtained by the speech-to-text function of a meeting service 100 without using a microphone and a speaker. Chatting, sharing documents presented by other participants, and transmitting an image of the user can be individually switched on/off, depending on whether the meeting is the main meeting or a sub meeting.

According to the present example embodiment, the user can participate in a first meeting as the main meeting while constantly communicating with the other participants with the audio, images, shared documents, etc., and can participate in the second meetings while only monitoring the proceedings converted into texts.

However, there are cases in which the user needs to respond to a second meeting. In this case, when the user clicks on the icon of the audio on the screen of the second meeting (or clicks off the icon of the audio on the screen of the first meeting and clicks on the icon of the audio on the screen of the second meeting), as illustrated in FIG. 8, the screen of the first meeting displays the proceedings converted into a text by the speech-to-text function of the meeting service 100, and the user can use the microphone and the speaker for the second meeting. The proceedings of the second meetings converted into texts by the speech-to-text function are continuously displayed until the function is set to off. According to the present example embodiment, the user can actively participate in and respond to any second meeting only when it is necessary, and the user can check the proceedings of the first meeting later.

Next, a configuration of the example embodiment will be described. FIG. 6 illustrates a configuration of the system according to the present example embodiment. The system includes the meeting service 100 and the meeting application 200 on an information terminal (PC/smartphone) of the user.

For example, the meeting service 100 includes: a meeting server 110, which is a server apparatus in the cloud and which provides a function of exchanging audio, images, etc., necessary for meetings; a web server 120; a DB server 130 in which various kinds of system settings are stored; and user meeting settings 150 in which meeting setting information of the individual user is held.

The meeting application 200 on the information terminal (PC/smartphone) of the user is connected to the meeting service 100 via a network.

Description of Operation

In the above-described example, a single meeting application 200 is used. Hereinafter, an example embodiment in which a plurality of meeting services 100*a* and 100*b* (not illustrated) and meeting applications 200*a* and 200*b* (not illustrated) are used will be described.

When starting a meeting, the meeting application 200*a* or 200*b* determines whether a microphone and a speaker are being used. If the microphone and the speaker are not being used, the meeting application 200*a* or 200*b* starts the meeting as a normal main meeting and uses the microphone and the speaker. If the microphone and the speaker are being used, the meeting application 200*a* or 200*b* starts the meeting as a sub meeting, and displays the proceedings converted into a text by the speech-to-text function of the meeting service 100 without using the microphone and the speaker.

In addition, the meeting application 200*a* or 200*b* determines whether the microphone and the speaker are being used after the user switches on the audio. If the microphone and the speaker are not being used, the meeting application 200*a* or 200*b* controls the microphone and the speaker such that the microphone and the speaker can be used for the meeting. When the user switches off the audio, the meeting application 200*a* or 200*b* makes the microphone and the speaker available for another meeting, and the proceedings converted into a text by the speech-to-text function of the meeting service 100 is displayed.

When the microphone and the speaker are not being used, if the meeting application 200*a* is started, the meeting application 200*a* starts a meeting as the main meeting, and the user can use the microphone and the speaker. In this state, if the meeting application 200*b* is started, since the microphone and the speaker are already being used by the meeting application 200*a*, the meeting application 200*b* starts a meeting as a sub meeting and displays the proceedings converted into a text by the speech-to-text function of the meeting service 100*b*, without using the microphone and the speaker.

When the user needs to respond to a participant in the meeting started by the meeting application 200*b*, the user switches off the audio on the screen of the meeting application 200*a* such that the meeting application 200*a* displays the proceedings converted into a text by the speech-to-text function of the meeting service 100*a*, and switches on the audio on the screen of the meeting application 200*b* such that the user can use the microphone and the speaker.

According to the present example embodiment, even when different meeting applications are used, the user can participate in a main meeting while constantly communicating with the other participants with the audio, images, shared documents, etc., and can participate in sub meetings while only monitoring the proceedings converted into texts. In this way, the user can actively participate in and respond to the sub meetings only when it is necessary, and can check the proceedings of the main meeting later.

Description of Advantageous Effect

The user can participate in a main meeting while constantly communicating with the other participants with the audio, images, shared documents, etc., and can participate in sub meetings while only monitoring the proceedings converted into texts. The user can actively participate in and respond to the sub meetings only when it is necessary, and can check the proceedings of the main meeting later.

All or part of the above-described example embodiments can be described as the following notes. However, the following notes are only examples of the present invention. That is, the present invention is not limited to the following notes.

[Note 1]

See the terminal apparatus according to the above-described first aspect.

[Note 2]

The terminal apparatus preferably according to note 1, further including: an input part that receives audio and an image; a transmission setting part that sets a transmission setting in which a mode for transmitting audio and an image is set, for an individual one of the meeting servers as transmission destinations; and a transmission part that transmits, based on the transmission settings, audio data of the audio and image data of the image to the meeting servers corresponding to the meeting data, wherein the transmission setting part sets the transmission setting(s) of the sub meeting data differently from the transmission setting of the main meeting data.

[Note 3]

The terminal apparatus preferably according to note 2, wherein the output setting part sets a setting(s) such that the audio of the sub meeting data is not outputted, and wherein the transmission setting part sets a setting(s) such that no audio is transmitted to a transmission source(s) of the sub meeting data.

[Note 4]

The terminal apparatus preferably according to any one of notes 1 to 3, further including: a speech-to-text part that converts the audio of the meeting data into texts by using speech recognition, wherein the output part outputs the resultant texts obtained by the conversion.

[Note 5]

The terminal apparatus preferably according to note 4, wherein the speech-to-text part converts the audio of the sub meeting data into a text(s), and wherein the output part outputs the resultant text(s) of the sub meeting data obtained by the conversion.

[Note 6]

The terminal apparatus preferably according to note 4 or 5, wherein when a character string(s) set in advance is included in a conversion result(s), the speech-to-text part outputs a notification(s).

[Note 7]

The terminal apparatus preferably according to any one of notes 1 to 6, further including: an audio output setting reception part that receives an operation for activating or deactivating audio output for the individual one of the meeting data, wherein the output setting part activates or deactivates the audio output for the individual one of the meeting data, based on the operation, wherein if the audio output of meeting data is activated, the selection part selects this meeting data as main meeting data and selects the other meeting data as sub meeting data, wherein if the audio output of meeting data is deactivated, the selection part selects this meeting data as sub meeting data and selects one of the other meeting data as main meeting data.

[Note 8]

The terminal apparatus according to any one of notes 1 to 7, wherein when the reception part starts to receive distributed meeting data, if the output part is already outputting audio or if the input part is already receiving audio, the selection part handles the distributed meeting data as sub meeting data.

[Note 9]

See the output method according to the above-described second aspect.

[Note 10] See the program according to the above-described third aspect. Notes 9 and 10 can be expanded in the same way as note 1 is expanded into notes 2 to 8.

The disclosure of the above PTL, etc. referred to in the above is incorporated herein by reference thereto. The example embodiments or modifications and adjustments of the example embodiments are possible within the scope of the overall disclosure (including the claims) of the present invention and based on the basic technical concept of the present invention. Various combinations or selections (including partial deletion) of various disclosed elements (including the elements in each of the claims, the individual example embodiments, the elements in each of the example embodiments, the elements in each of the drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST

10: terminal apparatus
11: reception part
12: selection part
13: output setting part
14: output part
15: input part
16: transmission setting part
17: transmission part
18: speech-to-text part
21-23: meeting server
24 to 26: window
27: speaker
28: document
51: CPU
52: memory
53: input/output interface
55: internal bus
100, 100a, 100b: meeting service
110: meeting server
120: web server
130: DB server
150: user meeting settings
200, 200a, 200b: meeting application

What is claimed is:

1. A terminal apparatus, comprising:
at least one processor; and
a memory in communication with the processor,
wherein the at least one processor is configured to execute program instructions stored in the memory to:
receive a plurality of meeting data, each distributed from a corresponding meeting server among a plurality of meeting servers;
select one of the plurality of meeting data as main meeting data, and select a remainder of the plurality of meeting data as sub meeting data;
set, based on the selection of the main meeting data and the sub meeting data, an output setting in which a meeting data output mode is set, for each of the plurality of meeting data;
output, based on the output settings, the plurality of meeting data; and
receive an operation for activating or deactivating audio output for each of the plurality of meeting data,
wherein the output settings of the sub meeting data are set differently from the output setting of the main meeting data,
wherein the audio output for each of the meeting data is activated or deactivated, based on the operation,
wherein the one of the plurality of meeting data is selected as the main meeting data, and the remainder of the plurality of meeting data are selected as the sub meeting data, based on the audio output of one of the plurality of meeting data is being activated or the audio output of the remainder of the plurality of meeting data being deactivated.

2. The terminal apparatus according to claim 1, further comprising:
an input part configured to receive audio and an image;
wherein the at least one processor is configured to execute program instructions stored in the memory to:
set a transmission setting in which a mode for transmitting audio and an image is set, for an individual one of the plurality of meeting servers as transmission destinations; and
transmit, based on the transmission settings, audio data of the audio and image data of the image to the plurality of meeting servers corresponding to the plurality of meeting data,
wherein the transmission settings of the sub meeting data are set differently from the transmission setting of the main meeting data.

3. The terminal apparatus according to claim 2,
wherein the audio of the sub meeting data is not outputted, and
wherein no audio is transmitted to a-transmission sources of the sub meeting data.

4. The terminal apparatus according to claim 1, wherein the at least one processor is configured to execute program instructions stored in the memory to:
convert the audio of the meeting data into texts by using speech recognition; and
output the resultant texts obtained by the conversion.

5. The terminal apparatus according to claim 4, wherein the at least one processor is configured to execute program instructions stored in the memory to:
convert the audio of the sub meeting data into a text; and
output the resultant text of the sub meeting data obtained by the conversion.

6. The terminal apparatus according to claim 4, wherein the at least one processor is configured to execute program instructions stored in the memory to:
based on a character string set in advance being included in a conversion result, outputs a notification.

7. The terminal apparatus according to claim 1, wherein the at least one processor is configured to execute program instructions stored in the memory to:
based on audio being output or the input part receiving audio when distributed meeting data is received, handle the distributed meeting data as sub meeting data.

8. An output method, comprising:
receiving a plurality of meeting data, each distributed from a corresponding meeting server among a plurality of meeting servers;
selecting one of the plurality of meeting data as main meeting data, and selecting a remainder of the plurality of meeting data as sub meeting data;
setting, based on the selection of the main meeting data and the sub meeting data, an output setting in which a meeting data output mode is set, for each of the plurality of meeting data;
outputting, based on the output settings, the plurality of meeting data;
receiving an operation for activating or deactivating audio output for each of the plurality of meeting data;
based on the received operation, activating or deactivating the audio output for each of the plurality of meeting data;
based on the audio output of one of the plurality of meeting data being activated or the audio output of the remainder of the plurality of meeting data being deactivated, selecting the one of the plurality of meeting data as the main meeting data, and selecting the remainder of the plurality of meeting data as the sub meeting data, wherein the setting of the output settings comprises setting the output settings of the sub meeting data differently from the output setting of the main meeting data.

9. A non-transitory computer-readable recording medium storing thereon a program, wherein the programs, when executed by at least one processor, causes the at least one processor to execute a method comprising:

receiving a plurality of meeting data, each distributed from a corresponding meeting server among a plurality of meeting servers;

selecting one of the plurality of meeting data as main meeting data, and selecting a remainder of the plurality of meeting data as sub meeting data;

setting, based on the selection of the main meeting data and the sub meeting data, an output setting in which a meeting data output mode is set, for each of the plurality of meeting data;

outputting, based on the output settings, the plurality of meeting data;

receiving an operation for activating or deactivating audio output for each of the plurality of meeting data;

based on the received operation, activating or deactivating the audio output for each of the plurality of meeting data;

based on the audio output of one of the plurality of meeting data being activated or the audio output of the remainder of the plurality of meeting data being deactivated, selecting the one of the plurality of meeting data as the main meeting data, and selecting the remainder of the plurality of meeting data as the sub meeting data.

* * * * *